United States Patent [19]

Shah

[11] Patent Number: 5,241,623
[45] Date of Patent: Aug. 31, 1993

[54] METHOD AND SYSTEM FOR DELINEATION OF STRUCTURE AND LINKAGES BETWEEN KNOWLEDGE BASE MODULES

[75] Inventor: Rasiklal P. Shah, Latham, N.Y.

[73] Assignee: General Electric Company, Schenectady, N.Y.

[21] Appl. No.: 589,111

[22] Filed: Sep. 27, 1990

[51] Int. Cl.$^5$ ............................................. G06F 15/00
[52] U.S. Cl. ........................................ 395/76; 395/700
[58] Field of Search .................... 371/19; 395/700, 76, 395/51

[56] References Cited

U.S. PATENT DOCUMENTS

| | | | |
|---|---|---|---|
| 4,595,981 | 6/1986 | Leung | 364/300 |
| 4,752,889 | 6/1988 | Rappaport et al. | 364/513 |
| 4,809,170 | 2/1989 | Leblang et al. | 364/200 |
| 4,819,233 | 4/1989 | Delucia et al. | 371/19 |
| 4,928,236 | 5/1990 | Tanaka et al. | 364/513 |
| 4,956,773 | 9/1990 | Saito et al. | 364/200 |
| 5,170,465 | 12/1992 | McKeeman et al. | 395/700 |

OTHER PUBLICATIONS

Horowtiz et al., Fundamentals of Data Structures in Pascal, Computer Science Press, 1984, 210–215.
Declaration of Rasiklal P. Shah dated Nov. 14, 1990.
Ramamoorthy et al., "GENESIS" An Integrated Environment for Supporting Development and Evolution of Software, COMPSAC 85, IEEE, Oct. 1985, 472–479.
Charniak et al., Artificial Intelligence Programming 2nd ed., Lawrence Erlbaum Assoc., 1987, 276–303.
Topper, A., "Excelling with CASE", PC Tech Journal, Aug. 1988, 70–79.
Schwanke et al., "Configuration Management in BiiN TM SMS", Proc. 11th Intl. Conf. on Software Engineering, 1989, 383–393.

*Primary Examiner*—Michael R. Fleming
*Assistant Examiner*—Robert W. Downs
*Attorney, Agent, or Firm*—Paul R. Webb, II

[57] ABSTRACT

One form of the present invention is a method for identifying interrelations of a plurality of modules. The method includes the steps of identifying one of the plurality of modules as a start module; assigning the start module a link code for a calling module; creating a first entry listing the link code; searching the calling module for a load/call command; designating a module referenced by a load/call command as a called module; creating link code for the called module; and creating an entry listing the link code and the called module.

12 Claims, 4 Drawing Sheets

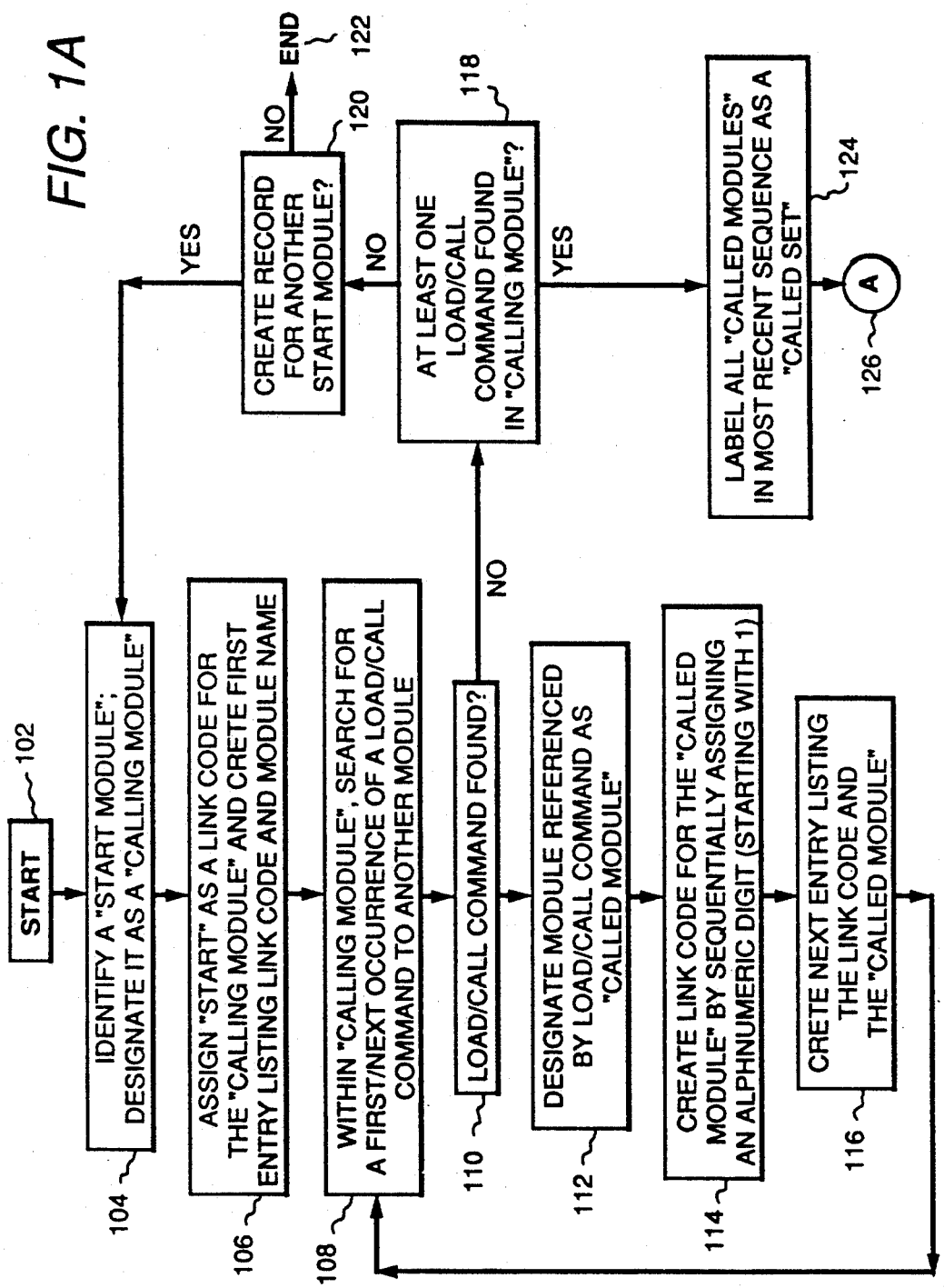

FIG. 2A

| LINK | CODE | MODULE | PROGRAM | FILE |
|---|---|---|---|---|
| START | 0000 | Login. dec | session start<br>system "erase flagalm.rec"<br>system "erase maintl.rec"<br>system "erase flags.rec"<br>system "erase maint.rec" | restart.dat |
| 1 | 0001 | (1)activity.dec | setfacts alarm.def/*.old<br>alarms<br>curalarm<br>session engine<br>session status<br>session display | alarm.old<br>engine.cur<br>status.dat<br>display.dat<br>alarm.dat<br>STOP |
| 11 | 0001 | (**) (1)activity.dec | | |
| 12 | 0002 | (1)intro.dec | | STOP |
| 13 | 0004 | (1)guided 2.dec | close display<br>alarm_tr<br>prevchk | alarmck.dat<br>remain.dat |
| 14 | 0005 | exit.dec | close record<br>close exit | restart.dat<br>STOP |
| 15 | 0010 | (1)reports.dec | reports summary-number<br>reports summary-date<br>reportsengine-date<br>reports engine-display<br>reports engine-number<br>reports engine-delete | count.lst |
| 16 | 0020 | (1)restart.dec | close record<br>close exit | restart.dat<br>RESET |
| 17 | 0038 | alarmcon.ift | | |
| 18 | 0050 | alarmchk.ift | | |
| 19 | 0500 | (1)runindex,dec | setfacts index.def/*.dat | lindexl.dat |
| 1A | 0851 | (1)temp | setfacts tempcase.def/*.fmt/*.out | tempcase.out<br>tempfact.lst<br>STOP |

FIG. 2B

| LINK | CODE | MODULE | PROGRAM | FILE |
|---|---|---|---|---|
| 13366111 | 1401 | (**)vibanal.dec | | |
| 13366112 | 1403 | (**)p5p3tnd.dec | | |
| 13366113 | 1405 | (**)lowthchk.dec | | |
| 13366114 | 1406 | (**)stalvlid.dec | | |
| 13366115 | 1407 | (**)wrmtltst.ift | | |
| 13366116 | 1408 | (**)gunrdchk.dec | | |
| 13366117 | 1429 | (**)stalvlid.ift | | |
| 13841231 | 0003 | (**)recomdet.dec | | |
| 13841232 | 0005 | (**)exit.dec | | |
| 13841233 | 0020 | (**)(1)restart.dec | | |
| 133631191 | 1410 | (**)envelchk.dec | | |
| 133631192 | 1411 | hireschk.dec | | |
| 133631193 | 1425 | stlflagt.dec | | |
| 133631194 | 1426 | stlflagt.dec | | |
| 133631341 | 1601 | (**)bddatack.dec | | |
| 133631441 | 1311 | bkl-ts01.ift | | maint.rec tsrecom.dat |
| 133631451 | 1312 | bk1-ts02.ift | | maint.rec tsrecom.dat |
| 133631461 | 1313 | bk1-ts03.ift | | maint.rec tsrecom.dat |
| 133631471 | 1314 | bk1-ts04.ift | | maint.rec tsrecom.dat |
| 133631641 | 1315 | bk2-ts01.ift | | maint.rec tsrecom.dat |
| 133631841 | 1316 | bk3ts01.ift | | maint.rec tsrecom.dat |
| 133631851 | 1317 | bk3ts02.ift | | maint.rec tsrecom.dat |
| 133631861 | 1318 | bk3ts03.ift | | maint.rec tsrecom.dat |
| 1336311921 | 0405 | (**)helphirs.dec | | |

METHOD AND SYSTEM FOR DELINEATION OF STRUCTURE AND LINKAGES BETWEEN KNOWLEDGE BASE MODULES

The United States Government has rights in this invention pursuant to Contract No. F33657-85-C-2131 awarded by the U.S. Air Force.

BACKGROUND OF THE INVENTION

1. Field of the Invention

The present invention generally relates to expert systems, and more particularly, relates to a method and system for identifying interrelations between knowledge base modules.

2. Related Art

In expert system applications, heuristic and procedural expert knowledge typically is represented in several logic modules. The number of such modules often times approaches several hundred. Each logic module may contain numerous calls to external programs, data files, or external devices such as a video disk. Further, the logic modules may be interconnected by a "call" or a "load" command for transferring inference control during execution.

Until now, a system user generating an expert system application was essentially left to "brut force" for devising a method of cross checks between modules. The system user would manually attempt to identify the numerous inference paths to verify the logical accuracy of the path. These manual procedures are tedious, time consuming and susceptible to error.

Moreover, in most expert system applications, links between various logic modules are continually updated as new logic modules are added to reflect additional expert knowledge. In this state of constant flux, the user's task of keeping the overall logic structure robust becomes even more repetitious and increasingly more time consuming.

Before now, no automated method or system provided information such as the longest stack size present during an inference operation, explicit identification of inference paths for any of the numerous diagnostic procedures built into an expert application, and identification of the various exit paths provided. No known system provides identification of "blind", i.e., unintended, inference paths or highlighting of questionable linkages between modules.

SUMMARY OF THE INVENTION

The present method and system for delineation of structure and linkages between knowledge base modules provides for generation of a module map, in tabular format, which may be used during the generation of and updating of a modular expert system application. The module map provides that the user may actuatlly follow inference paths and allows a user to pinpoint any source of inconsistency or unintended inferencing.

More particularly, once a system user identifies a knowledge base composed of a plurality of modules and identifies a start module within the database, the present invention automatically creates the tabular module map. The module map may include, for example, five columns which contain link code for each module, a numeric code and an alphanumeric label for each label, the name of all external programs called, and the data files for each logic module. This information provides a complete trace of each inference path in the knowledge base.

BRIEF DESCRIPTION OF THE DRAWINGS

These and other objects of the present invention, together with further features and advantages thereof, will become apparent from the following detailed specification when read together with the accompanying drawings, in which:

FIGS. 1A-B illustrate a flowchart representing method steps in accordance with the present invention; and FIGS. 2A-B illustrate a partial module map generated by the present system.

DETAILED DESCRIPTION OF THE DRAWINGS

Figure 1B:
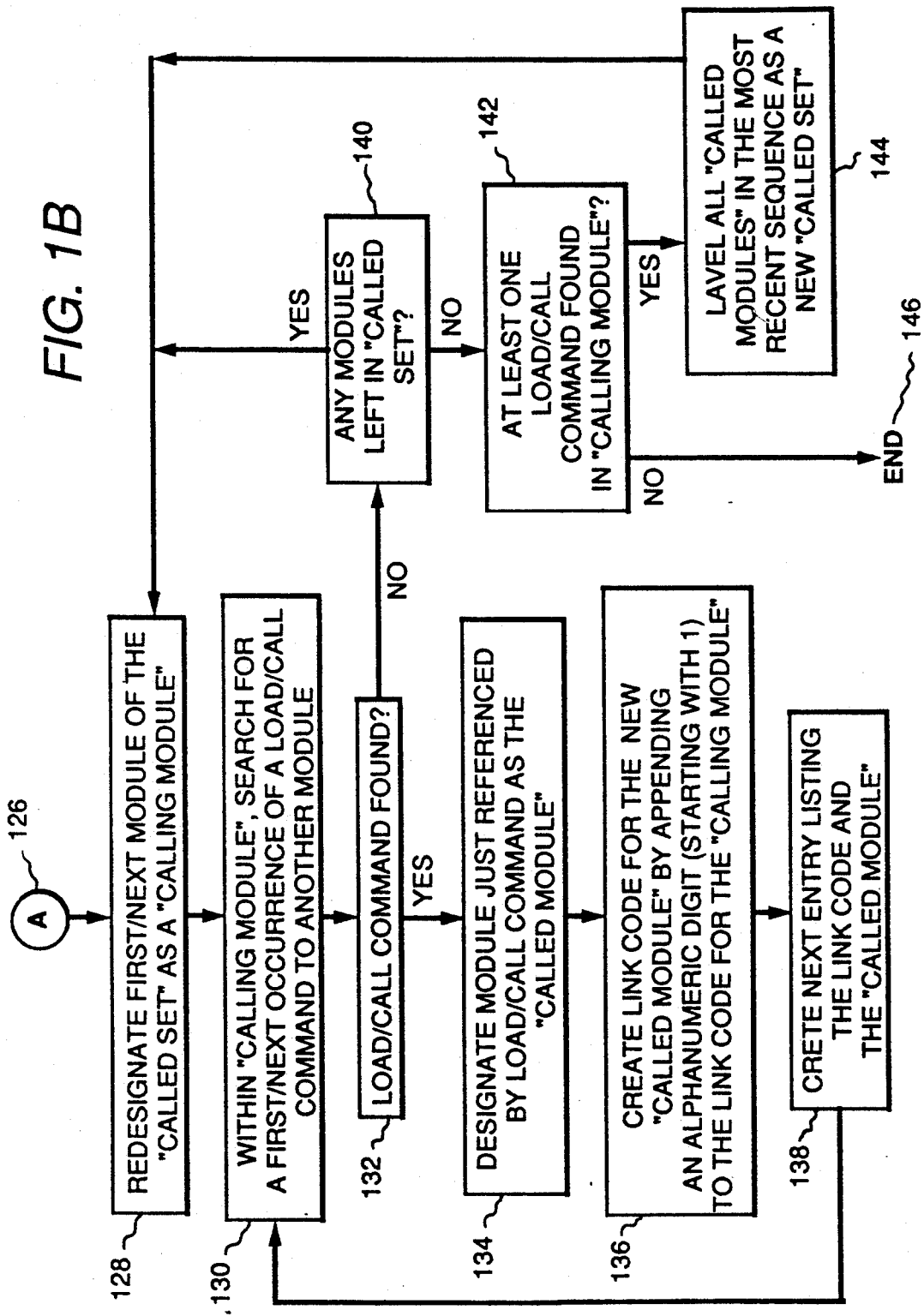

The present invention is a method and system for generating a module map which delineates structure and linkages between knowledge base modules. The present invention is not limited to practice with any one particular knowledge base or with any particular number of knowledge base modules. The present invention could be used for a knowledge base containing hundreds of modules or in a knowledge base containing only a few modules. The present invention is preferably practiced by a computer to provide automated generation of a module map.

Referring now more particularly to FIGS. 1A-B, subsequent to initiation of operations as indicated by a start legend 102, a system user identifies a start module as indicated at step 104. Once the system user identifies the start module, the present system automatically designates the start module as a calling module. The next step, as indicated at 106, is to assign a label "start" as a link code for the calling module and to create a first entry listing for the link code and module name. Then, as indicated at 108, within the calling module, a first occurrence of a load/call command to another module is searched for. Then, as indicated at 110, if a load/call command is found, the module referenced by the load/call command is designated as the called module. As indicated at 114, a link code is created for the called module by sequentially assigning an alphanumeric digit to the called module. A next entry listing is created in the link code and for the called module as indicated at 116. Operations return to step 108 where the called module is searched for a next occurrence of a load/call command to another module. If no load/call command is found, then the system determines whether at least one load/call command was found in the calling module as indicated at 118. If a load/call command is not found in the calling module, then the system requests the system user to create a record for another start module. If the system user does not wish to create a record for another start module, operations end as indicated at 122. If the system user does create a record for another start module, then operations return to step 104 and the above procedure is repeated.

If at least one load/call command is found in the calling module, then all called modules and the most recent sequence are labelled "called set" as indicated at 124. Operations continue to those illustrated in FIG. 1B as indicated by a connect legend A 126. For this first pass, the first module of the "called set" is designated as a "calling module". Then, within the "calling module" a first/next occurrence of a load/call command to another module is searched for as indicated at 130. If a load/call command is found as indicated at 132, then the module just referenced by the load/call command is designated at the "called module" as shown at 134. Then, as indicated at 136, a link code is created for the new called module by appending an alphanumeric digit, starting with 1, to the link code for the "calling module". Then, a next entry listing is created for the link code and the called module as indicated at 138. Operations return to step 130.

If a load/call commmand is not found, then it is determined whether any modules are left in the called set as indicated at 140. If modules are left in the called set, operations return to step 128 and the above procedures are repeated. If no modules are left in the called set, then operations continue to step 142 where it is determined whether at least one load/call command is found in called set. If there is at least one load/call command in the called set, then all called modules in the most recent sequence are labelled as a new called set as indicated at 144. Operations then return to step 128. If there is not at least one load/call command found in the called set, then operations end as indicated at 146.

The present invention will now be described in the context of an application in which the algorithm was tested. The application consisted of about 200 modules, 30 external system-level programs and 90 datafiles. The programs and datafiles were accessed several times from the backplanes of the modules. Each module was given an alphanumeric title to provide a short-hand clue to its function; in addition, a 4-digit numeric label was given to each module.

The algorithm and its implementation are now described by reference to the "module map" resulting from it. For simplicity, only the first page (initial portion) and the last page (final portion) of the module map for the application example are represented by FIGS. 2A and 2B, respectively.

The module map consists of five columns. The first column contains the link code for each module. The second and third columns contain the numeric code and alphanumeric label for each module. The fourth column contains the name of all external system-level programs, and the fifth column refers to the datafiles for each logic module.

The first entry of the module map is for the "default starting module" of the knowledge base (labelled login.dec and code 0000); the assigned link code for this module is START. Entries in the fourth and fifth columns are inserted by reviewing the backplanes of the module.

The "START" module (i.e. login.dec) leads to a module called activity.dec (code 0001) through a "load" command. This module link is underscored by labelling this module as "1" in the link column. The "load" command is indicated by a prefix (1) to the module name. Entries in the remaining columns for this module are inserted as hereinbefore described.

The "1" module (i.e. "activity.dec") in turn links to 9 other modules, plus a recursive loading back to its root node. These links to various modules are represented here by the 10 entries labelled "11" through "1A" under the "link" column. Thus, for example, "11" is a recursive "load" link, indicated by the entry ()(1)activity.dec. The prefix () denotes that this module has been described prior to the current location, hence entries under "program" and "file" columns need not be repeated. Similarly, the entry labelled "12" indicates that a module "intro.dec" is called from "1" (i.e. activity.dec) using a "load" command. Since this is a new module, appropriate entries are made in columns 4 and 5. As indicated, modules represented by the link codes "14", "17" and "18" are called from the "1" module (i.e. activity.dec) by the "call" command, whereas the remaining modules are called by "load" command from the "1" module.

Thus, at each stage, a module accessed from an already-defined module is given a "link" code which is the "link" code for its parent module appended by an alphanumeric character. Thus, for example, the 10 modules accessed from "activity.dec", with a link code "1", have link codes 11 thru 1A. This process is repeated until a situation is reached when none of the modules in any of the multiple inference paths have a "call" or "load" command to another module. An example of the concluding portion of the tabular information resulting from this process is presented in FIG. 2.

The information resulting from this procedure includes the names of all the modules referenced in a knowledge base. This listing is of immense help during the dynamic phase of knowledge base development in identifying any modules which are superfluous or obsolete. A complete listing of all external programs and datafiles is similarly valuable.

The most powerful benefit of this algorithm, however, is illustrated by focusing on the "link" code column. The link code uniquely specifies the order in which the modules will be called in any inference path. For example, the link code "133631861" for module "bk3-ts03.ift" in FIG. 2B indicates the following sequence of modules during the inference (some of the module names/link codes listed below are taken from the complete listing of the "module map", partially represented by FIGS. 2A and 2B):

| LINK | MODULE |
|---|---|
| START | Login.dec |
| 1 | (1)Activity.dec |
| 13 | (1)Guided2.dec |
| 133 | alrsrt2.ift |
| 1336 | alrsrt2a.ift |
| 13363 | comb__8.dec |
| 133631 | cpltest.ift |
| 1336318 | (**)symtrue.dec |
| 13363186 | think8.dec |
| 133631861 | bk3-ts03.ift |

The above listing provides a complete trace of the inference path for this case. By looking at the listing, it is seen that two modules (link codes "1" and "13") in this chain are connected by the "load" command, whereas the rest are connected by "call" commands. Thus, during inference, the final call will be made to the module "bk3-ts03.ift", and then an inference engine would trace its step backwards until it encounters a load command "(1)", i.e. "Guided2.dec" in this case; the exit path would be from Guided2.dec.

Since the procedure provides explicit information from "start" to "exit" of each inference path, the developer has an accurate "at-a-glance" view of all the inference paths of the knowledge base at all times.

The length of the link code (i.e. number of digits/characters) is a measure of the stack size. For the application referenced by the above example, the longest stack is represented by the last entry in the "link" column, i.e. "1336311921" in FIG. 2B, meaning 11 modules deep.

While the present invention has been described with respect to specific embodiments, many modifications, variations, substitutions and equivalents will be apparent to workers in the art. Accordingly, it is intended that the invention be limited only by the spirit and scope of the appended claims.

What is claimed is:

1. A method for identifying interrelations of a plurality of modules, said method comprising the steps of:
   (a) identifying one of the plurality of modules as a start module;
   (b) assigning the start module a link code for a calling module;
   (c) creating a first entry listing the link code;
   (d) searching the calling module for a load/call command;
   (e) designating a module referenced by a load/call command as a called module;
   (f) creating link code for the called module;
   (g) creating an entry listing the link code and the called module; and
   (h) repeating steps (c)-(g) until all load/call commands have been found;
   (i) determining whether at least one load/call command was found in the calling module; and
   (j) creating a record for another start module if no load/call command was found.

2. A method in accordance with claim 1 wherein if at least one load/call command was found, said method further comprises the steps of:
   (a) labelling all called modules as a called set;
   (b) redesignating a module of the called set as a calling module;
   (c) searching the calling module for a load/call command;
   (d) designating a module referenced by a load/call command as a called module;
   (e) creating link code for the called module;
   (f) creating an entry listing the link code and the called module; and
   (g) repeating steps (c)-(f) until all load/call commands have been found.

3. A method in accordance with claim 2 further comprising the steps of:
   (a) determining whether any modules are left in a called set once all load/call commands are found in the calling module;
   (b) designating a next module of the called set as a calling module if any modules are left in the called set;
   (c) searching the calling module for a load/call command;
   (d) designating a module referenced by a load/call command as a called module;
   (e) creating link code for the called module;
   (f) creating an entry listing the link code and the called module; and
   (g) repeating steps (c)-(f) until all load/call commands have been found.

4. A method in accordance with claim 2 wherein creating link code for the called module comprises the step of sequentially assigning an alphanumeric digit to each called module.

5. A computer programmed to perform the steps of:
   (a) identifying one of the plurality of modules as a start module;
   (b) assigning the start module a link code for a calling module;
   (c) creating a first entry listing the link code;
   (d) searching the calling module for a load/call command;
   (e) designating a module referenced by a load/call command as a called module;
   (f) creating link code for the called module;
   (g) creating an entry listing the link code and the called module; and
   (h) repeating steps (c)-(g) until all load/call commands have been found;
   (i) determining whether at least one load/call command was found in the calling module; and
   (j) creating a record for another start module if no load/call command was found.

6. A computer programmed in accordance with claim 5 wherein said computer is programmed to further perform the steps of:
   (a) labelling all called modules as a called set if at least one load/call command was found,
   (b) redesignating a module of the called set as a calling module;
   (c) searching the calling module for a load/call command;
   (d) designating a module referenced by a load/call command as a called module;
   (e) creating link code for the called module;
   (f) creating an entry listing the link code and the called module; and
   (g) repeating steps (c)-(f) until all load/call commands have been found.

7. A computer programmed in accordance with claim 6 wherein said computer is further programmed to perform the steps of:
   (a) determining whether any modules are left in a called set once all load/call commands are found in the calling module;
   (b) designating a next module of the called set as a calling module if any modules are left in the called set;
   (c) searching the calling module for a load/call command;
   (d) designating a module referenced by a load/call command as a called module;
   (e) creating link code for the called module;
   (f) creating an entry listing the link code and the called module; and
   (g) repeating steps (c)-(f) until all load/call commands have been found.

8. A computer programmed in accordance with claim 7 wherein creating link code for the called module comprises the step of sequentially assigning an alphanumeric digit to each called module.

9. An apparatus comprising:
   (a) means for identifying one of the plurality of modules as a start module;
   (b) means for assigning the start module a link code for a calling module;
   (c) means for creating a first entry listing the link code;
   (d) means for searching the calling module for a load/call command;
   (e) means for designating a module referenced by a load/call command as a called module;
   (f) means for creating link code for the called module;
   (g) means for creating an entry listing the link code and the called module; and
   (h) means for repeating steps (c)-(g) until all load/call commands have been found;

(i) means for determining whether at least one load/call command was found in the calling module; and (j) means for creating a record for another start module if no load/call command was found.

10. An apparatus in accordance with claim 9 further comprising:

means for labelling all called modules as a called set;

means for redesignating a module of the called set as a calling module;

means for searching the calling module for a load/call command;

means for designating a module referenced by a load/call command as a called module; and means for creating an entry listing the link code and the called module.

11. An apparatus in accordance with claim 10 further comprising:

means for determining whether any modules are left in a called set once all load/call commands are found in the calling module;

means for designating a next module of the called set as a calling module if any modules are left in the called set;

means for searching the calling module for a load/call command;

means for designating a module referenced by a load/call command as a called module;

means for creating link code for the called module; and means for creating an entry listing the link code and the called module.

12. An apparatus in accordance with claim 9 wherein said means for creating link code for the called module comprises means for sequentially assigning an alphanumeric digit to each called module.

* * * * *